United States Patent [19]
Greenwood et al.

[11] 3,770,111
[45] Nov. 6, 1973

[54] APPARATUS FOR SORTING FRUIT ACCORDING TO COLOR

[75] Inventors: Charles S. Greenwood, Santa Clara; Donald W. Chamberlin, Los Gatos, both of Calif.

[73] Assignee: FMC Corporation, San Jose, Calif.

[22] Filed: May 3, 1972

[21] Appl. No.: 249,925

[52] U.S. Cl.............. 209/73, 209/74, 209/111.6, 250/359
[51] Int. Cl............................................. B07c 5/342
[58] Field of Search.................. 250/227, 220, 223, 250/226; 209/111.6, 111.7, 73, 74

[56] References Cited
UNITED STATES PATENTS

| | | | |
|---|---|---|---|
| 3,173,017 | 3/1965 | Thayer | 250/226 |
| 3,626,196 | 12/1971 | Arnandin, Jr. | 250/227 X |
| 2,881,919 | 4/1959 | Bartlett | 209/111.6 |
| 3,349,905 | 10/1967 | Crawford | 209/111.7 X |
| 3,245,533 | 4/1966 | Rottmann | 209/111.7 |
| 3,005,549 | 10/1961 | Flander et al. | 209/111.6 |

Primary Examiner—Allen N. Knowles
Attorney—F. W. Anderson et al.

[57] ABSTRACT

Apparatus for sorting fruit according to the color thereof includes a conveyor which is arranged to receive fruit in bulk, singulate the fruit into a randomly spaced arrangement, and transport the fruit through a sorting head to a discharge station where the fruit can be discharged to one of three locations in accordance with its color characteristics as determined by the sorting head. This head includes a plurality of lights for illuminating the surface of the fruit as it passes through the head and a ring spaced radially from said conveyor which is adapted to mount the inlet ends of a plurality of fiber light guides so that they define a cylindrical band. The outlet ends of the light guides are brought together into bundles to direct the light reflected from the fruit to two photodetectors. Signals from these photodetectors operate a pair of solenoids and a pair of associated air blast means at the discharge station to selectively tilt certain fruit off the conveyor.

19 Claims, 12 Drawing Figures

FIG_8

FIG_9

APPARATUS FOR SORTING FRUIT ACCORDING TO COLOR

BACKGROUND OF THE INVENTION

1. Field of the Invention

The present invention generally pertains to apparatus for sorting fruit according to the color thereof, and more particularly, it pertains to apparatus for sorting individual fruit upon a relatively high speed basis so as to make the apparatus adaptable for use in fruit packing house operations.

2. Description of the Prior Art

Colorimetry, i.e., the analysis of objects on the basis of their color, has many industrial applications particularly in the paint and dye industries. Generally speaking, attempts to apply the colorimetry methods and apparatus as used in these industries to the color sorting of fruits and vegetables have been unsuccessful. This is due to a variety of reasons. In the first place, fruit and vegetables must be sorted according to certain color characteristics thereof at very high processing rates, e.g., several articles per second, while the color sorting processes used in other industries generally permit the object under inspection to be viewed over a considerable period of time. Secondly, the packing of fruit and vegetables is a low profit margin operation wherein costs that do not result in a direct increase in output must be maintained at a minimum; hence, complex color sorting machinery requiring excessive maintenance cannot be tolerated. With regard to the latter point, however, it should be noted that color sorting decisions in the fruit grading art are basic rather than subtle, and therefore the relatively sophisticated (and expensive) trichromatic sorters of the prior art are not necessary. That is to say, great precision in determining the color grade of an apple is not required since fruit and vegetables are usually sorted only into a few classes as compared with the almost infinite variety of classes into which paints or dyes, for example, may be graded. Furthermore, the present manual fruit color sorting operation is a very inexact science at best.

Another reason that commercial colorimeters are not easily adaptable to the fruit packing industry is that fruit and vegetables are irregular objects which are delivered to the color determining apparatus in an infinite variety of shapes and sizes. This factor presents a real mechanical problem as well as an optical problem in providing an apparatus which will present each individual fruit to the color scanning device in a manner whereby the color can be reasonably accurately determined. For example, large fruit reflect more light from their surfaces than do small fruit, and this factor has been the cause of misoperation in certain of the prior art color sorting devices which were designed specifically for operation with fruit, as will be pointed out in more detail hereinafter.

Finally, it should be mentioned that fruit and vegetables, in general, are relatively fragile articles which require care in handling in order that they do not become bruised or otherwise damaged so as to become unappealing to the ultimate consumer. This is a particular problem in the means for physically separating the fruit once the color grade determination has been made, and such a problem is not generally faced by the trichromatic sorters of the prior art. It must be remembered that the aforementioned high processing rates must be maintained and that the conveyance and segregation of the fruit within the color sorting apparatus must be accomplished at high speeds despite the delicate nature of the product.

The packing operation for apples is representative of a fruit packing operation which has developed a real need for an apparatus to automatically sort the individual fruit upon the basis of color. At present, apples are harvested and then washed and dried prior to packing. Next, the apples are conveyed to sorting platforms where they are quality sorted by hand upon the basis of the characteristic color thereof. Following this procedure, the apples are graded by size and weight and then packed for shipment.

In the quality sorting operation, apples are sorted according to color, shape, surface blemishes, point defects, and degree of bruising. Using these criteria the apple industry presently sorts into four grades: extra fancy, fancy, "C," and cull (in descending order of quality). However, most of this quality sorting effort is devoted to sorting as determined by estimating the percentage of apple surface that is the characteristic color of the apple being sorted, i.e., red in the case of red delicious apples or yellow in the case of yellow delicious apples.

Designing a machine that can out perform the human apple sorter in detecting a characteristic color of the fruit has proven to be a very difficult task. The human eye has a wide field of scan and can discriminate some seven million hues of color. The human brain is unmatched in its ability to receive, store and interpret visual signals. The human hand with its opposed thumb and precision grip is fast, agile and yet gentle in its performance of the sorting operation. Taken together, the eye, brain, and hand combination is quite a bargain at the usual packing house wage. Yet the human apple sorter has some drawbacks which a mechanical sorting apparatus can overcome. The human apparatus is only about 80 percent accurate in its sorting operation since it sees only a limited portion of each apple. Also, the human hand, although quite fast, is not equal to the speeds producible by machinery. Most importantly, the human sorter is a tempermental and inconsistent performer, subject to distraction, boredom and fatigue.

Previous attempts to eliminate the human sorter and provide a machine for automatically sorting apples as well as other fruits and vegetables which are handled in bulk in packing houses have resulted in the construction of devices which, generally, have utilized a means for conveying the fruit past a sorting head that included lights to illuminate the surface of the fruit and a photodetector to detect the intensity of the light reflected from the surface of the fruit. In most prior art color sorting operations the reflected light from the fruit was split into two fractions at two different bands of wavelengths of light and the intensities of the light received in the different bands were compared. This comparison would then provide an indication of the true color of the fruit. Downstream from the sorting head were located one or more reject mechanisms which would divert the selected fruit from the fruit carrying conveyor in accordance with its color determination.

These prior art devices presented two basic problems. First, it was difficult to get an accurate reading of the color over the entire surface of the fruit since the photodetector could generally read only a single spot on the fruit or, in other devices, take an optical "snapshot" of the entire fruit with an open lens system. Secondly, in many of the prior art systems, the apparatus was either rough on the fruit (as in those systems where the fruit was dropped through a sorting head) and was only suitable for use with tough-skinned fruit, such as lemons, or it required the singulating of the fruit into individual pockets or the like which greatly increased cost of the equipment and limited its processing rate.

The U.S. Pat. No. 3,206,022, to Roberts et al. for example, discloses apparatus for color sorting apples wherein the fruit is conveyed through a sorting head on a conveyor with each fruit being received in an individual pocket so that it can be discharged downstream from the head at the proper discharge station in accordance with the color determination made by the sorting head. Another prior art color sorting device, specifically designed for sorting peach halves, is shown in the U.S. Pat. No. 2,881,919 to Bartlett wherein a pair of parallel endless belts convey randomly arranged peach halves beneath a sorting head to permit certain areas of the fruit to be continuously scanned by a photodetector means. Still further prior art apparatus which used fixed pockets for carrying apples or the like through a sorting head is shown in the U.S. Pat. No. 3.393,800 to Durand. In the structure disclosed in the Durand patent the apples are passed through a ring having photodetector means positioned thereabout so as to encircle the apples as they are conveyed therepast. None of the devices disclosed in any of the aforedescribed patents, however, were altogether successful for use in high speed packing house operations, and none has found widespread use in the industry. Not only are problems presented in feeding and rejecting the fruit from the conveying apparatus without adding unduly to the cost of the equipment, but also a significant problem is presented in providing means whereby the entire surface of an apple can be continuously scanned in order to get an accurate and reliable reading.

SUMMARY OF THE INVENTION

With the apparatus of the present invention means are provided so that fruit, particularly apples, can be fed at random to a conveyor and carried in single file and random spacing through a color sorting head so that substantially the entire surface of each fruit can be viewed within the head and an accurate determination made in order to reject the fruit from the conveyor in accordance with its color characteristics. The apparatus is capable of operating at relatively high speeds, i.e., at speeds of at least five apples per second of the largest sized apples which are presently being color graded.

The apparatus includes a conveyor which carries the fruit through the sorting head but permits substantially all of the fruit surfaces to be exposed to view. Within the sorting head there is located a source of light which illuminates the entire exposed surface of each fruit. It is a special feature of the present invention that the means for measuring the light reflected from the surface of the fruit includes a plurality of fiber light guides arranged uniformly within the sorting head so that their inlet ends define a cylindrical, or partially cylindrical, band extending in a transverse plane about the conveyor. The light received by these fiber light guides is then directed to a photodetector, which may be similar to those used by the prior art color sorting devices, so that an output signal will be delivered which will provide color information so as to make an individual fruit separation or discharge determination. The fiber light guides will gather light over a much larger portion of the fruit than was possible with the fruit color sorting devices of the prior art, and they do so, generally, with a considerable decrease in optical complexity.

The fruit discharge means is located downstream from the sorting head and includes means for delivering each fruit one way or the other off of the conveyor. Since one decision which can be made by the color sorting apparatus is to not discharge the fruit from the conveyor, it will be recognized that the apparatus of the present invention provides means for sorting fruit into three color grades.

Another feature of the present invention is the fact that sensing means are provided at both the sorting head and at the discharge station to detect the presence of a fruit and thereby operate the color reading and rejecting mechanisms respectively. This arrangement permits the random conveyance of fruit through the apparatus and reduces the need for a complex fruit singulating and conveying system.

DESCRIPTION OF THE PREFERRED EMBODIMENT

Figure 1:
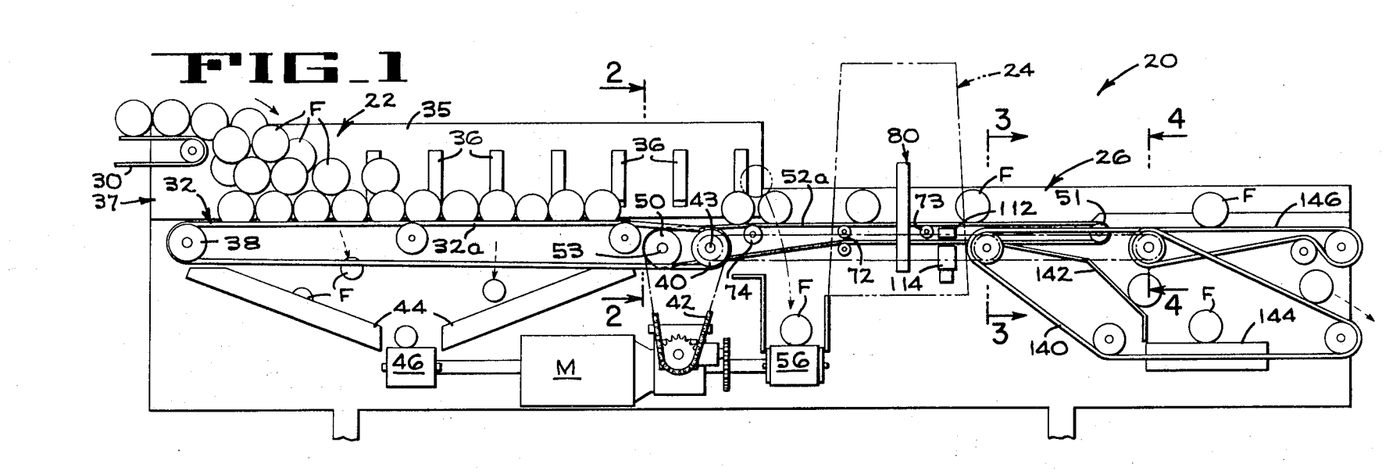
FIG. 1 is a longitudinal section through the fruit sorting apparatus of the present invention.

Referring now more particularly to the drawings, FIG. 1 discloses the general construction of the fruit sorting apparatus 20 of the present invention which apparatus is designed to singulate a bulk supply of fruit F at a delivery station 22, transport the fruit to a sorting head 24 where each fruit will be graded in accordance with a determination made of its color characteristics, and finally transport the fruit to a discharge station 26 where each fruit will be discharged in one of three distinct directions in accordance with the color determination made by the sorting head. The apparatus of the present invention is particularly designed for color sorting apples although it will be readily apparent from the ensuing description that the apparatus, with but minor modifications at best, could operate to sort any fruit or vegetable in accordance with the external color characteristics thereof.

Figure 2:
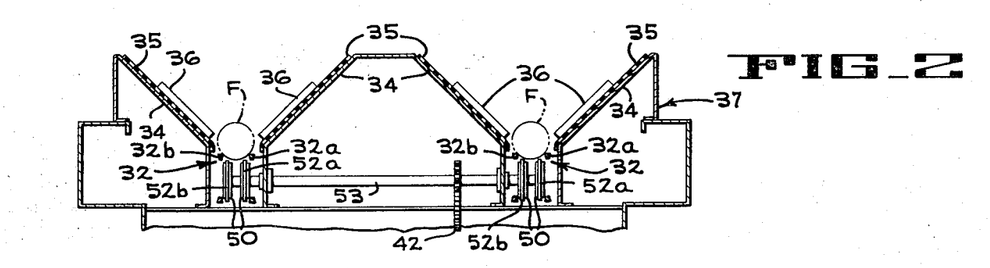
FIG. 2 is an enlarged transverse section taken along the line 2—2 of FIG. 1.

At the fruit delivery station 22 the fruit F is adapted to be received in bulk from a horizontal transport conveyor 30 which discharges the fruit onto a conveyor 32 that is comprised of a pair of endless parallel belts 32a and 32b (FIG. 2) of small cross section such as the conventional V-belts. These belts are mounted so that their upper runs extend along the bottom of a trough formed by two upwardly inclined walls 34 which are each provided on their upwardly facing surfaces with resilient padding 35 and which are further provided with a plurality of rubber abutment members 36 arranged along the length of the trough in spaced positions (as shown in FIG. 1). As can be seen in FIG. 2 or the plan view of FIG. 5, the apparatus of the present invention is disclosed in the form of a "two-lane machine" wherein two conveyors 32 are arranged in parallel and are each located between a trough formed by the inclined walls 34 which walls form a portion of the general trough frame structure 37. Thus, the fruit can be split into two distinct and independent grading operations. Since the structure involved in each individual grading operation is the same, only one lane of the apparatus will be described hereinafter, it being understood that the second lane is constructed and operates in the same manner. Furthermore, it will be readily apparent that the apparatus of the present invention could be made in any desired width so as to include a multiplicity of lanes if desired all of which operate in synchronism.

The belts 32a and 32b are each trained about an idler pulley 38 at their upstream end and a drive pulley 40 at their downstream end which latter pulleys are adapted to be continuously driven by a motor M through a drive chain 42 (FIG. 1), the drive chain being in driving engagement with a drive shaft 43 which carries each of the drive pulleys 40 in each fruit grading lane. The belts 32a and 32b are spaced far enough apart so that undersized and, therefore, non-gradeable fruit will drop between the belts to a pair of underlying inclined ramps 44 (FIG. 1) which will direct such fruit to a laterally extending take-away conveyor 46 that is also driven from the motor M. As shown in FIG. 2, the upper run of the belts 32a and 32b is located at a position below the lower end of the inclined walls 34 so that only a single line of fruit can be received upon the belts. Fruit which is received on top of the fruit that is carried on the belts may be propelled forwardly by the belts for a short time. However, as such fruit is progressed along the trough, the abutment members 36 will engage it and force it rearwardly until it finds a place where it can drop down onto the conveyor belts. Thus, at the forward end of conveyor 32 adjacent to the drive pulleys 40, it is normally expected that substantially all of the fruit will be singulated.

Just upstream from the drive pulleys 40 and positioned between the belts 32a and 32b are a pair of drive pulleys 50 which mount the upstream end of a second pair of endless conveyor belts 52a and 52b. These latter belts are arranged so as to receive the fruit carried by the belts 32a and 32b and carry it through the sorting head 24. The belts 52a and 52b are received about idler pulleys 51 at their downstream ends after passing the fruit discharge station 26. The drive pulleys 50 for belts 52a and 52b are mounted upon a drive shaft 53 (FIG. 2) which is also connected by means of the drive chain 42 to the drive motor M. As can be seen in FIG. 1, the trough frame structure 37 ends just after the fruit is received upon the inner conveyor belts 52a and 52b, and thus, any fruit which is not supported directly upon the conveyor belts will be caused to gravitate onto an underlying take-away conveyor 56 which extends laterally of the apparatus and is also driven from the main drive motor M. By properly choosing the correct diameter drive sprockets which are engaged by the drive chain 42, the conveyor belts 52a and 52b are arranged to be driven at a greater linear speed than the corresponding conveyor belts 32a and 32b so that fruit will become spaced somewhat as it proceeds downstream to the sorting head 24.

Considering now in detail the operation performed on the fruit as it proceeds through the sorting head 24, and referring particularly to FIGS. 6 through 9, it will be seen that the sorting head comprises a box-like frame structure 60 which is provided with a pair of openings 62 and 63 on the front and rearward sides thereof, respectively, in order to allow the conveyor belts 52a and 52b to pass therethrough. Mounted adjacent one side of the conveyor belts (FIG. 6) is a mounting block 65 which mounts at its upstream end a photocell light detector 66, and mounted on the opposite side of the conveyor belt is an enclosed frame structure 68 which mounts a light beam source 69 opposite to and in alignment with the photocell 66. As can be seen from FIGS. 6 and 7, the alignment of the photocell 66 and light source 69 lies in a plane just above the upper run of the conveyor belts 52a and 52b so that any fruit which is received and conveyed on the belts will break the beam. Obviously, this beam can then be used as a detection means to detect the presence or the absence of a fruit at a particular location within the sorting head and to activate the color sorting circuitry (not described in the present application) to read the fruit in order to determine its color. In order to prevent vertical deflections of the conveyor belts 52a and 52b, which may adversely affect the operation of the fruit detection beam, a first pair of idler pulleys 72 and a second pair of idler pulleys 73 (FIG. 7) are provided to guide the belt through the scanning zone of the apparatus. These idler pulleys 72 and 73 are positioned at a slightly higher elevation than the pulleys 51 at the downstream end of the belts 52a and 52b and at a slightly higher elevation than are a pair of guide pulleys 74 (FIG. 1) spaced upstream from the sorting head so that the belts will remain taut over the short distance between the pulleys 72 and 73 as they move through the sorting head.

Spaced upstream from the photocell 68 and light source 69 are a plurality of lights 75 which are mounted upon the interior of the frame structure 60 and which are directed toward both the bottom and the top surfaces of the conveyor belts 52a and 52b so as to illuminate all sides of a fruit which is passing through the viewing area of the sorting head.

Figure 6:
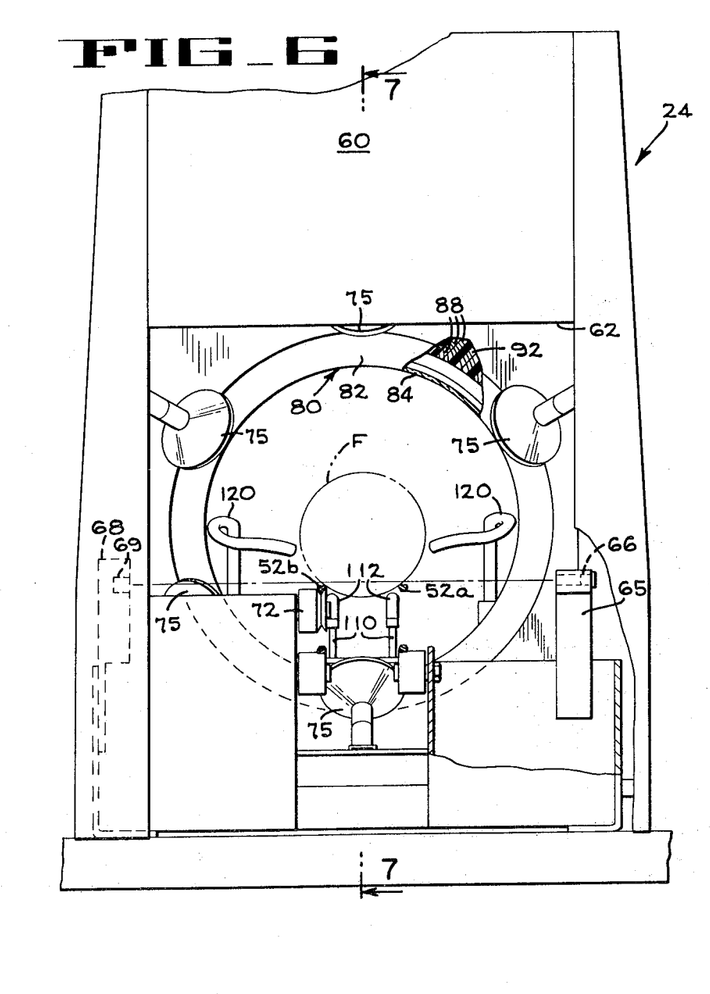
FIG. 6 is an enlarged front elevation of the sorting head shown in phantom lines in FIG. 1.
Figure 7:
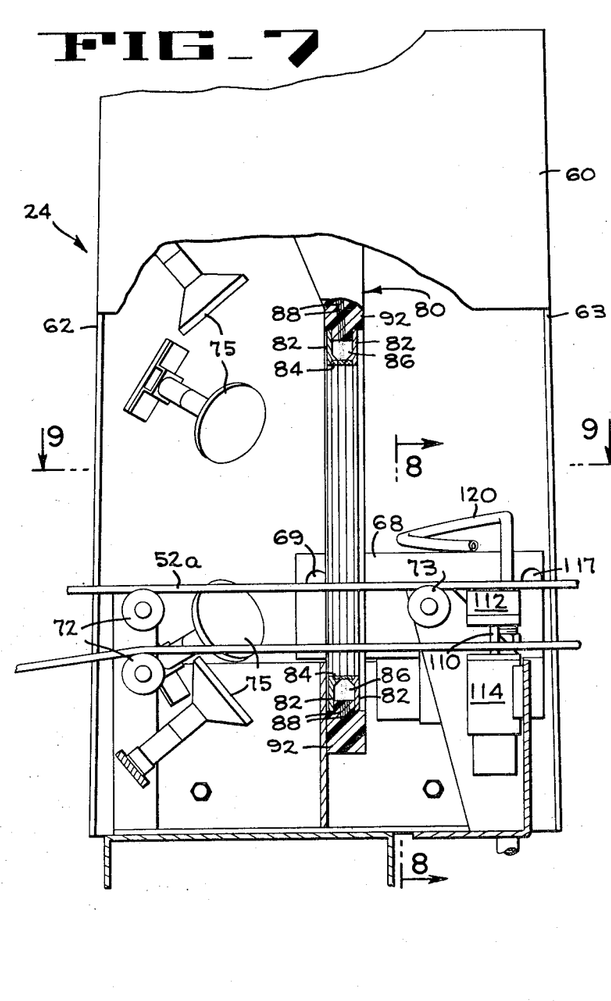
FIG. 7 is a longitudinal section taken along the line 7—7 of FIG. 6.

One of the primary features of the sorting apparatus of the present invention is the structure and operation of the means for viewing the illuminated fruit in order to ascertain the color thereof. This viewing head 80, as particularly shown in FIG. 6, is a ring-shaped member which encircles the conveyor belt so that the fruit being scanned will be located approximately in the center thereof. As shown in the sectional view of FIG. 10 the viewing head includes a pair of cylindrical ring members 82 which are mounted in parallel so as to leave a narrow cylindrical gap 83 therebetween. This gap is sealed off by a transparent glass shield 84 of cylindrical shape which is mounted to the inner circumferential faces of the rings 82 and acts to prevent any fruit juices or other debris from dropping from the fruit into the scanning apparatus. Gap 83 opens into an enclosed chamber 86 formed between the side walls of the ring members 82. The outer end of this chamber is defined by the inlet ends of a plurality of fiber optic light guide members 88 which are typically comprised of glass fibers with a diameter of some small fraction of an inch. The inlet ends of the fibers are positioned in a narrow cylindrical band extending for a full 360° entirely around the viewing head which band is generally of the same transverse dimensions as that of the viewing gap 83. The transmitting, or outlet, ends of all of the fiber light guides are brought to the top of the viewing head structure where they are formed into two tightly packed bundles and directed to a detector block 90. (FIG. 11).

From the foregoing description it can be seen that light which is reflected from the circumferential surface of a fruit as it is passed through the viewing head 80 will be reflected through the glass shield 84 and gap 83 to the inlet ends of the fiber light guides 88. The gap 83 is very small in its transverse dimension (in practice about 0.156 inches) and the spacing of the gap from the ends of the fibers is relatively large (about an inch) so that only light directly reflected in the radial direction from the surface of the fruit will be received by the light guides. However, since these light guides are spaced throughout a complete 360° viewing area around the fruit there will be sufficient available light for operating the color detection and determining apparatus. It will also be recognized that the narrow band of reflected light which is viewed by the light guides at any given instant permits a spot detection system to be realized, i.e., a fruit can be graded upon the basis of a characteristic color seen only in a localized area of the fruit. On the other hand, conventional integrating circuitry can be utilized to provide an average reading for the entire fruit surface if desired.

Figure 10:
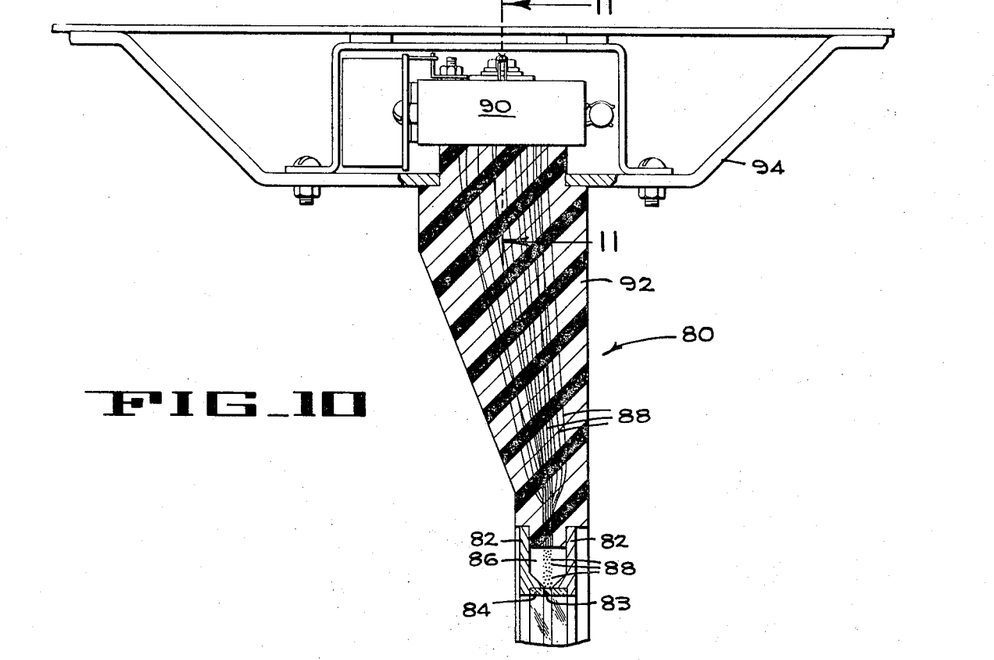
FIG. 10 is an enlarged vertical section through the upper end of the sorting head particularly showing the means whereby the fiber light guides are directed to the photodetection devices.

It will be understood that the two bundles of light transmitting fibers 88 which are directed to the detector block 90 will each be composed of fibers selected uniformly throughout the length of the circumferential viewing area so that each bundle in the detector block will be receiving light of generally the same intensity. A plastic material 92, such as one of the conventional epoxy resins, is used to encase all of the fiber light guides so that such light guides will be unaffected by external lighting conditions. This resin plastic material is then used to mount the upper end of the viewing head to an overlying bracket frame structure 94 as shown in FIG. 10.

Figure 11:
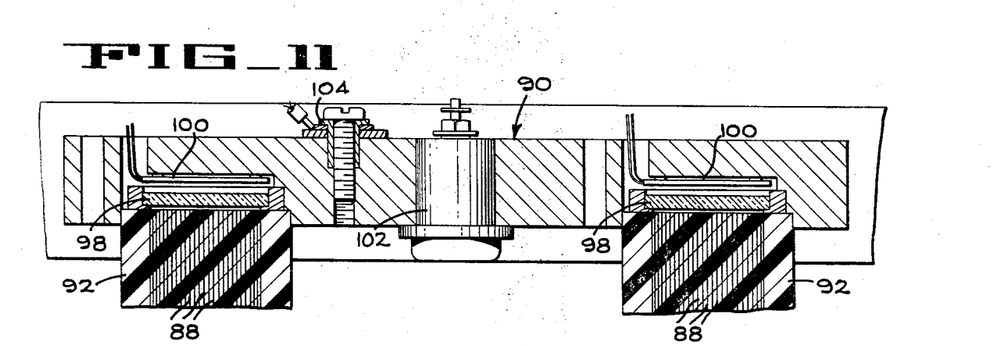
FIG. 11 is an enlarged section taken along line 11—11 of FIG. 10 particularly illustrating the photodection devices and the mounting means therefor.

The detector block 90 is shown in detail in FIG. 11. This block mounts above each of the bundles of fiber light guides a filter disk 98 through which the transmitted light must pass before reaching a solid state photodetector 100 also mounted within the block. As with color sorting apparatus of the prior art, the filters 98 pass only certain bands of wavelengths of light to the photodetectors, and the light received in each band can then be compared in order to provide the information necessary for a determination of the color being viewed. While several of the prior art color detecting and determining circuits could be used with the aforedescribed apparatus of the present invention, a preferred circuit is disclosed in the patent application of Donald W. Irving et al., Attorney's docket No. SJ 6290, filed on even date herewith. Reference to this application may be had for the specific details of such circuitry.

Also mounted within the block 90 is a heat dissipating transistor 102. The block 90 is comprised of a good heat transmitting material so that the transistor 102 will uniformly heat the block to a stabilized temperature well above the ambient temperature. Thus, the photodetectors 100 are maintained at a uniform, or stabilized, temperature whereby the stray heat caused by varying ambient temperature conditions and by the illuminating lights 75 will not cause discrepancies in the output signals provided by these very heat sensitive elements. A temperature sensing thermistor 104 is bolted to the face of the block, and conventional regulating circuitry can be provided to control the current flow in the transistor 102 so that the temperature of the block will remain constant during operation of the apparatus.

As pointed out previously, the photocell 66 will detect the presence of a fruit just before it enters the area of the viewing head 80. Thus, the photocell can be used to turn on the detection and color determining circuitry of the viewing head so as to render it operative as the fruit passes therethrough. As the fruit is viewed, a color determination can be made with conventional color detection circuitry from the signals provided by the photodetectors 100, and additional circuitry of a conventional nature can be utilized to cause the discharge of the fruit at the discharge station 26 located at the downstream end of the sorting head. While conventional circuitry can be utilized to provide this discharging function, a preferred circuit is disclosed in the aforementioned patent application of Donald W. Irving et al and reference to said application may be had for the details thereof.

Figure 8:
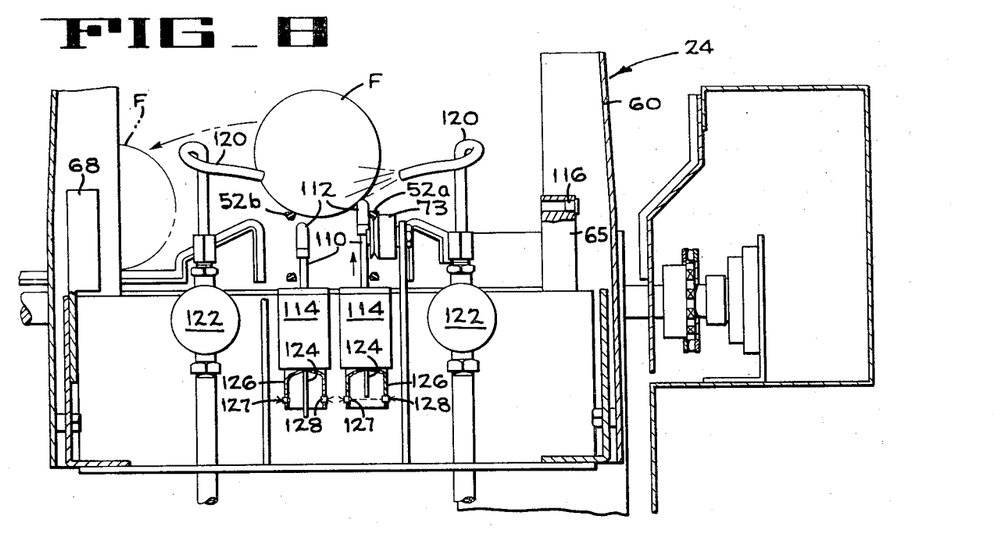
FIG. 8 is a transverse section taken along the line 8—8 of FIG. 7 particularly showing the discharge station and the means whereby fruit is selectively discharged from the conveyor.
Figure 9:
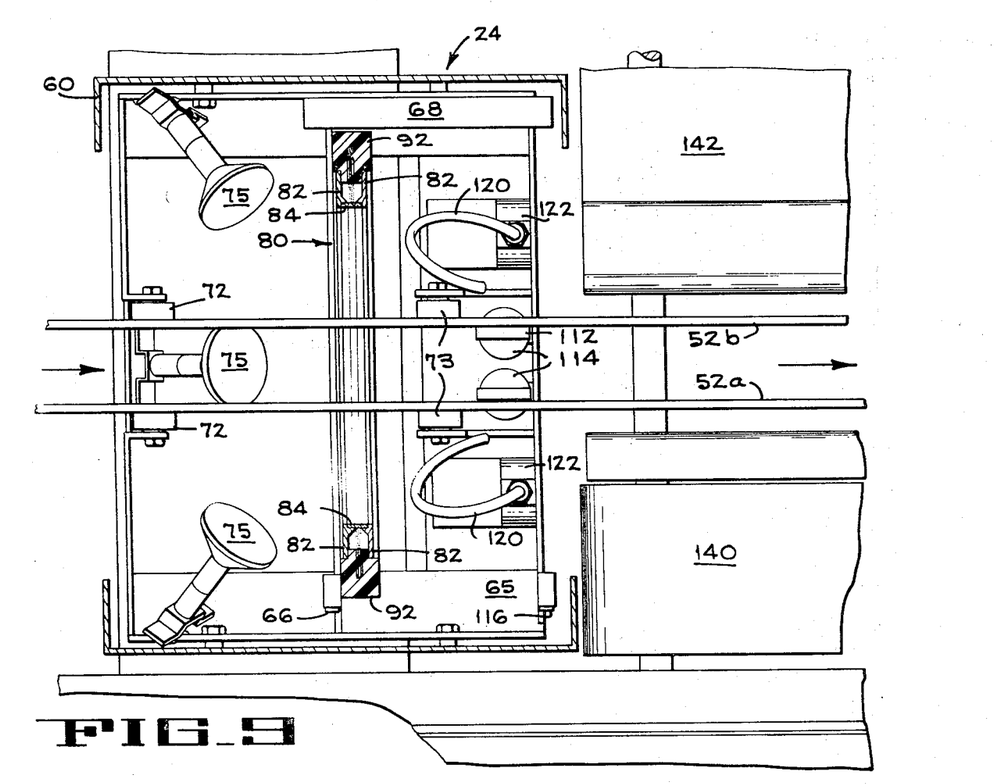
FIG. 9 is a horizontal section taken along the line 9—9 of FIG. 7.

In order to protect the relatively fragile fruit but yet maintain a high production rate with the apparatus of the present invention, a unique system of discharging the fruit has been devised. Basically, the reject apparatus comprises a pair of plungers 110 which are each provided with a resilient abutment member 112 at their upper ends and which are each adapted to be driven in a vertically upward direction by energization of a solenoid 114. One of these plungers is provided adjacent to the inner face of conveyor belt 52a, and the other plunger is located adjacent to the inner face of the other conveyor belt 52b (FIG. 8). A photocell 116, which is mounted upon the downstream end of the mounting block 65, is located laterally of the reject plungers, and a light beam source 117 (FIG. 7) is located within the enclosed frame structure 68 in a position directly opposite to the photocell 116 to project a light beam just over the upper surface of the conveyor belts 52a and 52b. The photocell 116 can, therefore, be used to determine the presence of a fruit at the discharge station, and, with the previously received information from the viewing head 80, the proper solenoid 114 can be energized at this time to deflect the fruit one way or the other laterally of the conveyor belts by rolling the fruit up and over one of the belts. In the case where neither solenoid is operated, the fruit will remain on the conveyor belts 52a and 52b and will continue to be carried in the downstream direction. Thus, three discharge directions are provided at the discharge station 26, and it will be understood that the color sorting circuitry should be set so as to determine one of three color grades for each individual fruit with the appropriate solenoid 114 (or no solenoid) being actuated in accordance with the selected color grade.

Operating in conjunction with the solenoids 114 are a pair of air blast tubes 120 (FIG. 8) which are positioned on opposite sides of the conveyor belts 52a and 52b and which are connected with a compressed air system (not shown) so that when valves 122 are opened a blast of compressed air will be directed against the side of a fruit to aid in ejecting the fruit to the appropriate side of the conveyor. The actuated solenoid at one side of the conveyor and the adjacent tube 120 will therefore both be actuated when it is desired to eject a fruit off the opposite side of the conveyor.

Figure 12:
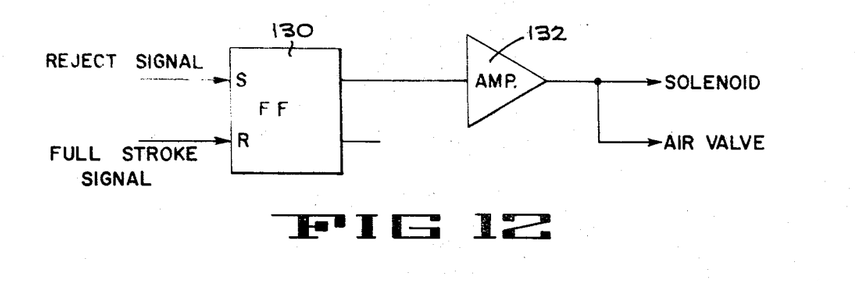
FIG. 12 is a schematic drawing of the electrical circuitry for operating the fruit discharge mechanisms.

FIG. 12 shows diagrammatically a circuit for operating the solenoids 114 and the air valves 122. Since a small fruit will be ejected more quickly than a large fruit and since the fruit following a small fruit will move into the reject area faster than the fruit following a large fruit, it is desired that the solenoids should be operated so that they return to their set, or retracted, position as quickly as possible in order to permit the apparatus to be operated at high processing rates. Consequently, the timed re-set action of conventional solenoids is not utilized. Instead, as shown in FIG. 8, a vane 124 is attached to the armature of each of the solenoids so as to move vertically therewith when the associated solenoid is energized. This vane extends downwardly within an enclosed hood structure 126 which mounts at the lower end thereof an aligned photocell 127 and an LED light source 128. These elements are aligned so that the photocell will be activated only when the vane 124 is moved to its uppermost position (as shown by the solenoid-operated plunger on the right-hand side in FIG. 8). The reject signal (FIG. 12), from the color detection and determining circuitry, is transmitted to a flip-flop circuit 130 when the fruit to be diverted enters the discharge station (as determined by the photocell 116) which flip-flop circuit, in turn, provides an output signal that is amplified by amplifier 132 and directed to the selected solenoid 114 and air valve 122. The signal from the flip-flop circuit is broken to reset the solenoid and the air valve upon the application of the full stroke signal to reset the flip-flop. This full stroke signal is provided when light beam contact is made between the associated LED 128 and the photocell detector 127. Thus, each solenoid plunger will be retracted just as soon as it reaches the point of its maximum projection. As noted heretofore, this may take a considerably longer amount of time when a large fruit is to be rejected than when a small fruit is to be rejected, and each solenoid will, therefore, operate in accordance with the type of fruit it is ejecting rather than strictly upon a timed basis as with the conventional prior art solenoid reject devices.

Figure 3:
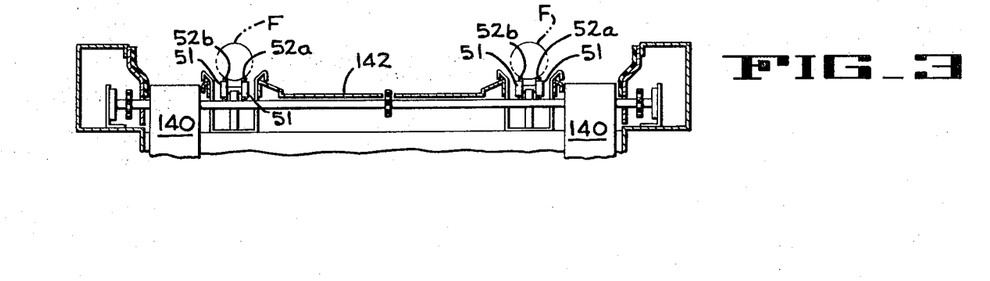
FIG. 3 is an enlarged transverse section taken along the line 3—3 of FIG. 1.
Figure 4:
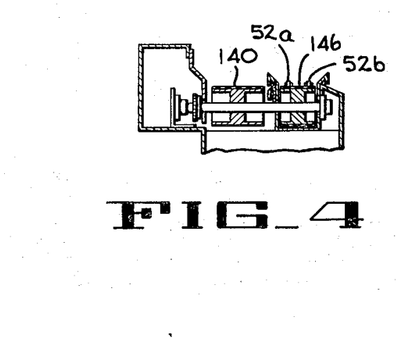
FIG. 4 is an enlarged transverse section taken along the line 4—4 of FIG. 1.
Figure 5:
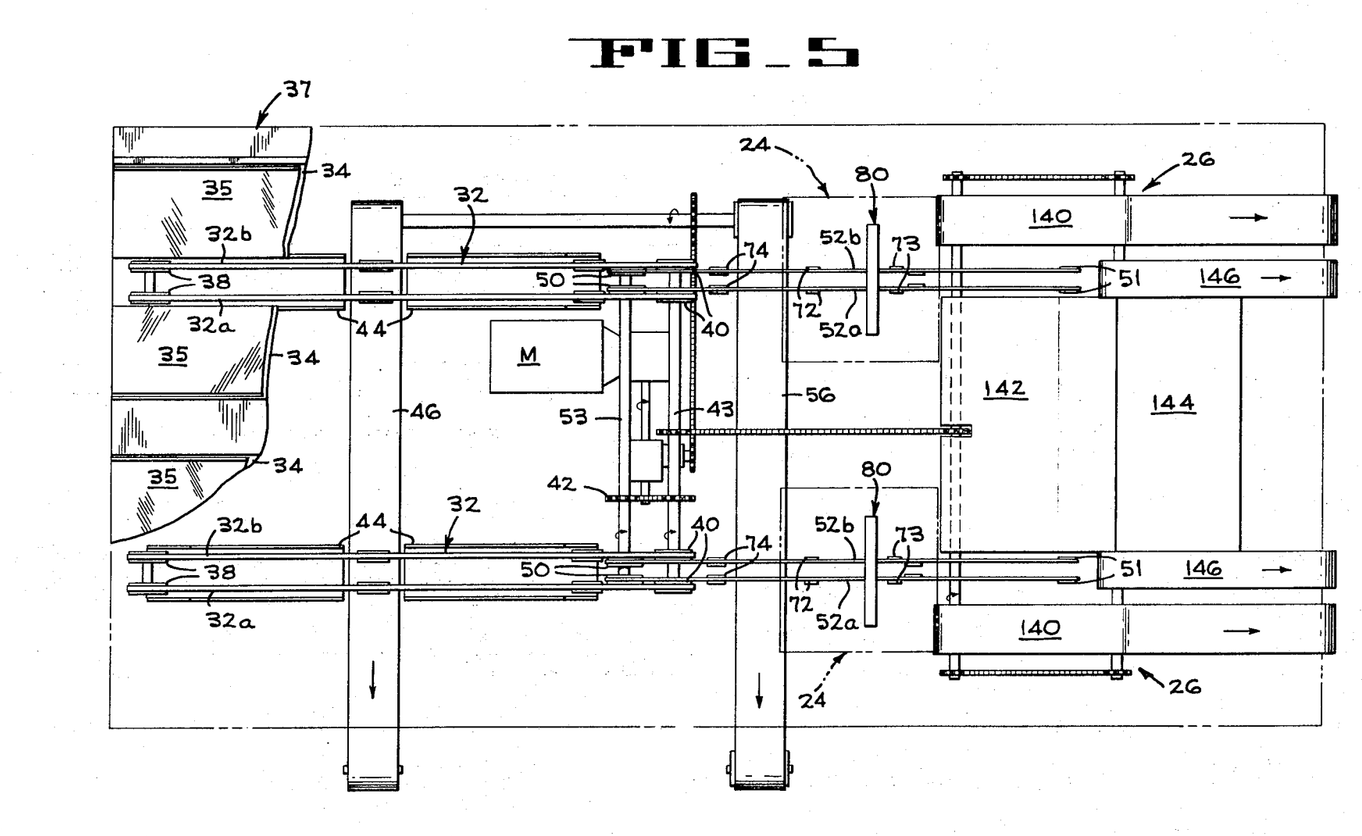
FIG. 5 is a plan of the apparatus shown in FIG. 1 with portions thereof being broken away for the purpose of clarity.

As shown in FIGS. 3, 4 and 5, ejection from the conveyor belts 52a and 52b at the discharge station 26 will direct the fruit either to an endless belt conveyor 140 arranged at the side of the apparatus or to an inclined ramp 142. The ramp will direct the fruit beneath the apparatus to a laterally extending endless belt conveyor 144 (FIG. 1). Fruit which is not ejected at the discharge station and which remains on the belts 52a and 52b will be directed to an endless belt conveyor 146 and conveyed out of the apparatus at the downstream end thereof separately from the fruit on the conveyors 140 and 144.

From the foregoing description it will be recognized that the apparatus of the present invention provides a highly reliable and efficient high speed system for color sorting fruit. This apparatus has proven to be extremely efficient in sorting apples which are easily bruised if handled too roughly and which have been difficult, if not impossible, to handle efficiently with the apparatus of the prior art. Furthermore, with the viewing head provided about the entire 360° circumference of the fruit so as to permit a continuous scanning of the entire surface of the fruit, minor spot differences in color (typical in apples) can be detected and a grading determination made by the apparatus. Thus, with appropriate color detecting and determining circuitry, apples or other fruit which have minor defects in certain locations thereof can be graded and discharged accordingly. While the apparatus is capable of operating at high speeds and thus making itself useful in conventional packing house operations, it will be noted that no complex or highly sophisticated mechanisms are utilized. The apparatus can therefore be constructed and maintained at a relatively low cost to provide a useful and highly desirable piece of equipment for the fruit packing industries.

Although the best mode contemplated for carrying out the present invention has been herein shown and described, it will be apparent that modification and variation may be made without departing from what is regarded to be the subject matter of the invention.

What is claimed is:

1. Apparatus for sorting fruit according to color comprising a conveyor for carrying said fruit along a horizontal path, a sorting head extending around said conveyor through an angular distance greater than 180°, said sorting head comprising means for lighting the surface of said fruit on said conveyor as it passes through said sorting head, said sorting head further comprising a plurality of fiber light guides for receiving and transmitting light reflected from said fruit, said light guides having their inlet ends positioned so as to define a narrow cylindrical surface extending circumferentially about said conveyor throughout the angular distance of said sorting head in a plane transverse to the direction of movement of said conveyor, and means downstream of said sorting head for discharging said fruit from said conveyor in accordance with the characteristics of the light received and transmitted by said light guides, said sorting head including means forming a narrow circumferential slit through which the light reflected from said fruit must pass before being received by said light guides, said slit being spaced radially inwardly from said surface defined by the inlet ends of said light guides.

2. Apparatus for sorting fruit according to color as set forth in claim 1 wherein the outlet ends of said light guides are brought together into at least one bundle, a heat conducting block for receiving and enclosing said bundle of light guides, a solid state photodetector mounted within said block adjacent said ends of said light guides for receiving the light transmitted thereby and for providing an electrical output signal in accordance with the intensity thereof, and means for heating said block to a constant temperature.

3. Apparatus for sorting fruit according to color as set forth in claim 2 including an optical filter positioned in said block between the ends of said light guides and said photodetector.

4. Apparatus for sorting fruit according to color comprising a conveyor for carrying said fruit along a horizontal path, a sorting head extending around said conveyor through an angular distance greater than 180°, said sorting head comprising means for lighting the surface of said fruit on said conveyor as it passes through said sorting head, said sorting head further comprising a plurality of fiber light guides for receiving and transmitting light reflected from said fruit, said light guides having their inlet ends positioned so as to define a narrow cylindrical surface extending circumferentially about said conveyor throughout the angular distance of said sorting head in a plane transverse to the direction of movement of said conveyor, and means downstream of said sorting head for discharging said fruit from said conveyor in accordance with the characteristics of the light received and transmitted by said light guides, said conveyor comprising a pair of narrow belts arranged in parallel relationship and adapted to support said fruit with each fruit being supported only at two points thereon on opposite transverse sides thereof, and means for delivering fruit to said conveyor in randomly spaced single file arrangement, said fruit delivery means comprising a fixed trough having outwardly diverging wall portions which extend upwardly from said conveyor, said trough being located upstream from said sorting head, means for delivering bulk fruit to the upstream end of said trough, said conveyor comprising a first section extending within said trough and a second section extending downstream from said first section and through said sorting head, and means for moving said second conveyor section at a greater linear speed than said first conveyor section.

5. Apparatus for sorting fruit according to color as set forth in claim 4 wherein both of said first and second conveyor sections are comprised of spaced parallel belts and wherein the spacing of the belts in said second section is less that of the belts in said first section.

6. Apparatus for sorting fruit according to color comprising a conveyor for carrying said fruit along a horizontal path, a sorting head extending around said conveyor through an angular distance greater than 180°, said sorting head comprising means for lighting the surface of said fruit on said conveyor as it passes through said sorting head, said sorting head further comprising a plurality of fiber light guides for receiving and transmitting light reflected from said fruit, said light guides having their inlet ends positioned so as to define a narrow cylindrical surface extending circumferentially about said conveyor throughout the angular distance of said sorting head in a plane transverse to the direction of movement of said conveyor, means downstream of said sorting head for discharging said fruit from said conveyor in accordance with the characteristics of the light received and transmitted by said light guides, said fruit discharge means being arranged to either permit said fruit to remain on said conveyor or to dislodge it therefrom to one side or to the other of said conveyor, first and second fruit collecting means positioned on opposite sides of said conveyor to receive discharged fruit, and a third fruit collecting means at the downstream end of said conveyor to receive discharged fruit whereby said fruit can be sorted into at least three separate color grades by said apparatus, said fruit discharge means comprising a pair of selectively operable solenoid-operated plungers arranged to move in a vertically upward direction when energized to engage the bottom portion of a fruit and tilt it off the conveyor, said plungers being arranged at opposite sides of said conveyor.

7. Apparatus for sorting fruit according to color as set forth in claim 6 wherein said fruit discharge means further comprises a pair of pneumatic means positioned above said plungers for selectively directing air blasts at said fruit to further aid in the discharge thereof.

8. Apparatus for sorting fruit according to color as set forth in claim 6 including sensing means for determining when an energized plunger has reached its full stroke, and means responsive to said sensing means for returning said energized plunger to its retracted position immediately after it reaches its full stroke.

9. Apparatus for sorting fruit according to color comprising a conveyor for carrying fruit along a horizontal path, a sorting head surrounding said conveyor along a portion of said path and including means for lighting the surface of said fruit on said conveyor, said sorting head further including means for detecting the light reflected from said fruit, means for delivering fruit to said conveyor so that said fruit is singulated in a randomly spaced arrangement, means spaced downstream of said sorting head for discharging said fruit from said conveyor in accordance with the characteristics of the reflected light received by said light detecting means, and means positioned adjacent said fruit discharge means for detecting the presence of a fruit so as to render said discharge means operative, said fruit discharging means being operatively connected to said means for detecting the light reflected from said fruit and to said means for detecting said fruit adjacent said discharge means in order to permit said apparatus to sort randomly spaced and randomly conveyed fruit with discharge at a position spaced from said sorting head.

10. Apparatus for sorting fruit according to color as set forth in claim 9 wherein said fruit discharge means is arranged to either permit said fruit to remain on said conveyor or to discharge it therefrom to one side or to the other of said conveyor, first and second fruit collecting means positioned on opposite sides of said conveyor to receive discharged fruit, and a third fruit collecting means at the downstream end of said conveyor to receive discharged fruit whereby said fruit can be sorted into three separate color grades by said apparatus.

11. Apparatus for sorting fruit according to color as set forth in claim 10 wherein said conveyor comprises a pair of spaced parallel belts and wherein said discharge means comprises a pair of selectively operable solenoid-operated plungers arranged to move in a vertically upward direction when energized to engage the bottom portion of a fruit and tilt it off the conveyor, said plungers being arranged between said belts at opposite sides of said conveyor and adjacent to said means for detecting the presence of a fruit.

12. Apparatus for sorting fruit according to color as set forth in claim 11 wherein said discharge means further includes a pair of open-ended tubes positioned on opposite sides of said conveyor and above and outwardly of said conveyor in positions adjacent to said means for detecting the presence of a fruit, and means for selectively supplying compressed air to said tubes to aid in discharging a fruit from said conveyor.

13. Apparatus for sorting fruit according to claim 11 including sensing means for determining when an energized plunger has reached its full stroke, and means responsive to said sensing means for returning said energized plunger to its retracted position immediately after it reaches its full stroke.

14. Apparatus for sorting fruit according to color as set forth in claim 13 wherein said sensing means comprises a member movable with said plunger, and a light detecting means actuated by the positioning of said member when said plunger is at full stroke.

15. In an apparatus for sorting fruit according to color which apparatus includes means for passing fruit in single file along a pathway and means operative in response to the amount of light reflected by said fruit for selectively discharging said fruit from said pathway, a sorting head comprising means for illuminating all side surfaces of said fruit as it is passed along said pathway, a ring mounted in said sorting head and encircling said pathway at the location where said fruit is illuminated, a plurality of fiber light guides mounted in said ring for receiving light reflected from said fruit and having their inlet ends distributed uniformly about said ring so as to define a cylindrical surface radially spaced from said fruit in said pathway, the outlet ends of said light guides being brought together into at least one bundle, a light detecting means positioned adjacent to said bundle of outlet ends of said fiber light guides for measuring the light received and transmitted by said light guides and for providing an electrical output signal, shield means enclosing said inlet ends of said light guides and extending radially inwardly therefrom, said shield means being provided with a narrow cylindrically shaped slit which is spaced radially inwardly from said inlet ends of the light guides so that said light guides receive substantially only the light directly reflected from said fruit in a narrow transverse planar segment as the fruit passes through said ring.

16. In an apparatus for sorting fruit according to color as set forth in claim 15 wherein said slit has a width of less than 0.5 inches.

17. In an apparatus for sorting fruit according to color as set forth in claim 15 including a transparent cylindrical ring sealing said slit so as to prevent the contamination of said fiber light guides.

18. In an apparatus for sorting fruit according to color as set forth in claim 15 including means for encasing said outlet ends of said light guides and said light detecting means, and means for heating said encasing means to a constant temperature.

19. Apparatus for sorting fruit according to color comprising a conveyor for carrying said fruit along a horizontal path, a sorting head extending around said conveyor through an angular distance of substantially 360°, said sorting head comprising an enclosed structure including means for lighting all surfaces of said fruit on said conveyor as it passes through said sorting head, said sorting head further comprising a plurality of fiber light guides for receiving and transmitting light reflected from said fruit, said light guides having their inlet ends positioned so as to define a narrow cylindrical surface extending circumferentially about said conveyor throughout the angular distance of said sorting head in a plane transverse to the direction of movement of said conveyor, means downstream of said sorting head for discharging said fruit from said conveyor in accordance with the characteristics of the light received and transmitted by said light guides, said conveyor comprising a pair of narrow conveyor belts arranged in parallel relationship and adapted to support said fruit with each fruit being supported only at two points thereon on opposite transverse sides thereof with said fruit being able to translate freely on said belts while said belts carry the fruit through said sorting head, and means for shielding said inlet ends of said light guides from direct illumination by said means for lighting the surfaces of said fruit.

* * * * *